United States Patent
Biasiotto et al.

(10) Patent No.: US 7,815,498 B2
(45) Date of Patent: Oct. 19, 2010

(54) DEVICE FOR DISTRIBUTION OF AIR WITHIN THE PASSENGER COMPARTMENT OF A VEHICLE

(75) Inventors: Marco Biasiotto, Orbassano (IT); Carloandrea Malvicino, Orbassano (IT); Fabrizio Mattiello, Orbassano (IT); Andrea Perosino, Orbassano (IT)

(73) Assignee: C.R.F. Societa Consortile Per Azioni, Orbassano (Torino) (IT)

( * ) Notice: Subject to any disclaimer, the term of this patent is extended or adjusted under 35 U.S.C. 154(b) by 234 days.

(21) Appl. No.: 11/845,855

(22) Filed: Aug. 28, 2007

(65) Prior Publication Data

US 2008/0108291 A1 May 8, 2008

(30) Foreign Application Priority Data

Nov. 8, 2006 (EP) .................................. 06425758

(51) Int. Cl.
*B60H 1/00* (2006.01)
*B60H 1/34* (2006.01)
*B64D 13/02* (2006.01)

(52) U.S. Cl. ............................. 454/69; 454/73; 454/75; 454/93; 454/94; 454/155

(58) Field of Classification Search ................... 454/73, 454/75, 93, 94, 155
See application file for complete search history.

(56) References Cited

U.S. PATENT DOCUMENTS

| 2,182,657 | A | * | 12/1939 | Carney | ...................... 187/389 |
| 3,264,971 | A | * | 8/1966 | Dangauthier | ................ 454/154 |
| 6,000,635 | A | * | 12/1999 | Justice | .................. 239/265.33 |
| 6,089,971 | A | * | 7/2000 | Jokela et al. | ................ 454/127 |
| 6,843,716 | B2 | | 1/2005 | Butera et al. | |
| 2007/0066207 | A1 | * | 3/2007 | Smith et al. | ................... 454/69 |

FOREIGN PATENT DOCUMENTS

| EP | 1580053 | 9/2005 |
| EP | 1382472 | 12/2005 |
| EP | 1544007 B1 | 4/2006 |
| EP | 1585642 B1 | 4/2006 |
| EP | 1544005 B1 | 5/2006 |
| EP | 1368207 B1 | 7/2006 |
| JP | 2003276431 | 9/2003 |
| JP | 2006062500 | 3/2006 |

\* cited by examiner

*Primary Examiner*—Steve McAllister
*Assistant Examiner*—Helena Kosanovic
(74) *Attorney, Agent, or Firm*—Heslin Rothenberg Farley & Mesiti P.C.; Victor A. Cardona

(57) ABSTRACT

A flow of air coming out of a louver facing the internal space of the passenger compartment of a vehicle is oriented, exploiting the Coanda effect, in an area adjacent to a first surface of the passenger compartment or in an area adjacent to a second surface of the passenger compartment.

7 Claims, 4 Drawing Sheets

DEVICE FOR DISTRIBUTION OF AIR WITHIN THE PASSENGER COMPARTMENT OF A VEHICLE

CROSS REFERENCE TO RELATED APPLICATIONS

This application claims priority from European patent application No. 06425758.7, filed on Nov. 8, 2006, the entire disclosure of which is incorporated herein by reference.

BACKGROUND OF THE INVENTION

The present invention relates to the field of devices for distribution of air within the passenger compartment of vehicles, such as motor vehicles, in particular cars, railway vehicles or aircraft.

SUMMARY OF THE INVENTION

The purpose of the present invention is to propose an innovative system for directing a flow of air supplied within the passenger compartment of a vehicle that will present characteristics of extreme simplicity and at the same time of high efficiency in operation.

The aforesaid purpose is achieved according to the invention by providing a device for distribution of air within the passenger compartment of a motor vehicle, which comprises:
- at least one air-outflow opening or louver, provided on a surface facing the internal space of the passenger compartment, for supplying, within the passenger compartment, a flow of air coming from an air-conditioning device; and
- a first surface of the passenger compartment and a second surface of the passenger compartment, both facing the internal space of the passenger compartment, which are set adjacent to one another and substantially divergent from one another starting from an area comprised between said first and second surfaces where the aforesaid outflow louver is provided,
- in which said second surface of the passenger compartment is provided with a flow-perturbing element, which can be displaced between an active position, in which it projects from said second surface of the passenger compartment, and an inactive position, in which it does not project from said second surface of the passenger compartment, and
- in which the relative position of the outflow louver and of the aforesaid first and second surfaces of the passenger compartment, as well as the profile of said first and second surfaces of the passenger compartment are such that:
- when the perturbing element is in its inactive position, the flow of air at output from the outflow louver tends to adhere, on account of the Coanda effect, to said second surface of the passenger compartment; whereas
- when said perturbing element is brought into its active position, the flow of air detaches from said second surface and tends to adhere and to remain adherent, once again on account of the Coanda effect, to said first surface.

It should be noted that the exploitation of the Coanda effect for directing a flow of air has already been proposed in the past. In particular, the present applicant is the holder of patents (see, for example, EP 1 368 207 B1, U.S. Pat. No. 6,843,716 B2, EP 1 382 472 B1, EP 1 585 642 B1, EP 1 544 005 B1, EP 1 544 007 B1) which regard air-distribution systems in which a main flow of air is distributed between a number of secondary conduits which branch off from a main inlet conduit exploiting the Coanda effect. The Coanda effect is the effect whereby a flow of air that comes from a conduit giving out into a wider chamber tends to adhere to the side wall of said chamber that is closest to the outlet mouth of the conduit. The applicant has proposed air-distribution devices that exploit said phenomenon, particularly for air-conditioning systems for motor vehicles, in which distribution of air between the various conduits provided within the dashboard of a motor vehicle is controlled without the need for any deflecting walls, which always entail a loss of energy in the flow of air. In addition, the devices based upon the Coanda effect proposed in the past by the present applicant present the further advantage, as compared to other known devices that use fluidic means for deviation of the flow, of not requiring the provision of transverse jets of air for controlling the direction of the main flow, which present also the drawback of altering the characteristics of the main flow, both because they are obtained by deflecting a portion of the main flow and because they impinge upon the main flow affecting the characteristics thereof.

The essential characteristic that distinguishes the device according to the present invention from the ones previously proposed by the present applicant is that it is not provided within a system of conduits for conveying the air in an air-distribution system, but rather is defined in the open space of the passenger compartment of a vehicle and exploits the same walls of the vehicle that delimit the passenger compartment for controlling the direction of the flow of air supplied within the passenger compartment.

According to a further characteristic, in order to potentiate further the Coanda effect, the space delimited between said first and second surfaces of the passenger compartment is closed at the two sides, at least partially, by respective shields arranged at the two sides of the outflow louver. In operation, said shields prevent the area of negative pressure that is generated on account of the Coanda effect in a region adjacent to the surface to which the flow of air adheres from recalling further air in the direction transverse to the two side areas on the outside of the region involved in the flow at output from the louver so as to prevent a decrease in effectiveness of the Coanda effect.

In an application of the invention to the passenger compartment of a motor vehicle, the aforesaid first surface of the passenger compartment is defined by the internal surface of the windscreen of the motor vehicles, and the aforesaid second surface of the passenger compartment is defined by the top surface of the dashboard of the motor vehicles, set underneath the windscreen. In this case, the outflow louver can be the one normally provided on the dashboard immediately underneath the windscreen for sending a flow of air along the internal surface of the windscreen, for example when a defrosting function is necessary. In the case of said application, the perturbing element is provided on the dashboard. The conformation is such that, when a flow of air is supplied to the outflow louvers provided on the dashboard, said flow remains adherent to the top surface of the dashboard so as to be oriented substantially in the direction of the driver and of the passenger sitting alongside him. Instead, when the perturbing element provided on the dashboard is brought into its active position, the flow of air is forced to detach from the top surface of the dashboard and to adhere, once again on account of the Coanda effect, to the internal surface of the windscreen. Of course, an altogether similar application can be envisaged, once again inside the passenger compartment of a motor vehicle in other regions of the passenger compartment, for example in an area adjacent to a side window or in an area adjacent to the rear window of the motor vehicle. Altogether similar applications can also be envisaged inside the passenger compartment of a railway vehicle or an aircraft.

The main advantage of the invention lies in the fact that orientation of a flow of air within the passenger compartment of a vehicle is obtained with means that are extremely simple and at the same time present a high efficiency of operation.

BRIEF DESCRIPTION OF THE DRAWINGS

The invention will now be described with reference to the annexed plate of drawings, which is provided purely by way of non-limiting example and in which:

FIGS. 2a and 3a illustrate at an enlarged scale a detail of FIGS. 2 and 3.

DETAILED DESCRIPTION OF THE INVENTION

Figure 1:
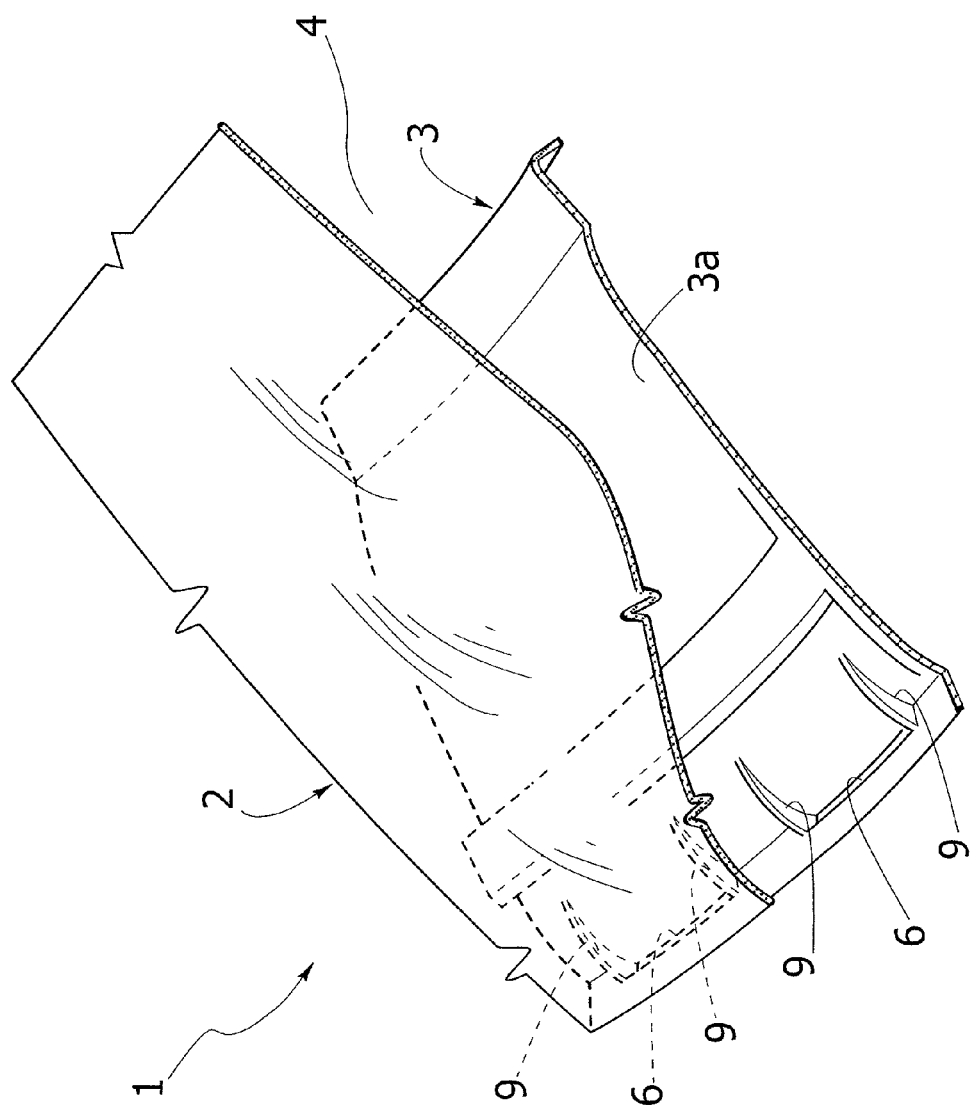
FIG. 1 is a partial perspective view of an example of embodiment of the invention applied to the passenger compartment of a motor vehicle, in the area comprised between the dashboard and the windscreen.

In the plate of drawings, the reference number 1 designates a motor vehicle having a windscreen 2 and a dashboard 3 (illustrated only schematically and partially in the plate drawings). The dashboard 3 has a top surface 3a set underneath the windscreen 2. The internal surface 2a of the windscreen 2 and the top surface 3a of the dashboard 3 face the internal space 4 of the passenger compartment of the motor vehicle. On account of their arrangement, the surfaces 2a, 3a adjacent to one another are set substantially divergent from one another starting from an area 5, comprised between them, where the wall of the dashboard 3 is provided with a series of louvers 6 (only two of which may be seen in FIG. 1 and just one of which is visible in FIGS. 2 and 3) coming out of which is a flow of air F, which passes through an internal conduit 7 from an air-conditioning device (not illustrated) of the motor vehicle.

As has already been mentioned above, the corresponding arrangement of the surfaces 2a, 3a and of the outflow louvers 6, as well as the profile of the surfaces 2a and 3a (in particular the profile of the surface 3a of the dashboard) are such that, in the absence of flow-perturbing elements, the flow F to the outlet of the louvers 6 remains adherent, on account of the Coanda effect, to the top surface 3a of the dashboard 3, so that it is finally oriented substantially in a direction A (FIG. 2) towards the driver and the passenger of the motor vehicle.

As has been likewise already mentioned above, according to the invention, the dashboard is provided with one or more flow-perturbing elements 8 (only one of which may be seen in FIG. 3), which are distributed throughout the length of the dashboard and can be displaced between an inactive position, in which they do not project from the surface 3a, and an active position (FIG. 3), in which they project from the surface 3a of the dashboard. Each perturbing element 8 is constituted, for example, by an elongated lip, extending longitudinally along the dashboard, which can be displaced through a slit made in the dashboard. The specific structure of each perturbing element 8 and the means used for controlling movement thereof between the inactive position and the active position are not illustrated herein in so far as they can be made in any one way, as is evident to the person skilled in the branch. Examples of perturbing elements of this type can be found, for example, in the patents U.S. Pat. No. 6,843,716 B2 and EP 1 382 472 B1 filed in the name of the present applicant. The perturbing element can also be constituted by an appendage of a rotating member controlled in rotation within the dashboard, as may be seen, for example, in the patent EP 1 382 472 B1 filed in the name of the present applicant. The control means can be motor means of any type or actuators of any type, including in particular actuator means using shape-memory elements. The perturbing element can also be constituted by one and the same portion of the wall of the dashboard 3, shaped so as to be elastically deformed.

To return to the description of the operation of the device according to the invention, when the perturbing element 8 is brought from the inactive position to the active position, the flow of air F is forced to detach from the surface 3a of the dashboard 3 and at this point is recalled, on account of the Coanda effect, by the internal surface 2a of the windscreen 2 and, once again on account of the Coanda effect, remains adherent thereto. At the moment when the perturbing element 8 were to be again retracted into the inactive condition, the flow of air F would return to adhering to the top surface of the dashboard.

As has already been said, in the condition of operation where the flow F is adherent to the top surface 3a of the dashboard 3, orientation of the air in the direction of the driver and the passenger is obtained. Instead, the condition illustrated in FIG. 3 with the flow F adherent to the internal surface of the windscreen is desirable when the aim is, for example, to provide a defrosting function or when it is desired to orient the flow of air also in the direction of the passengers occupying the rear seats of the motor vehicles.

Figure 2:
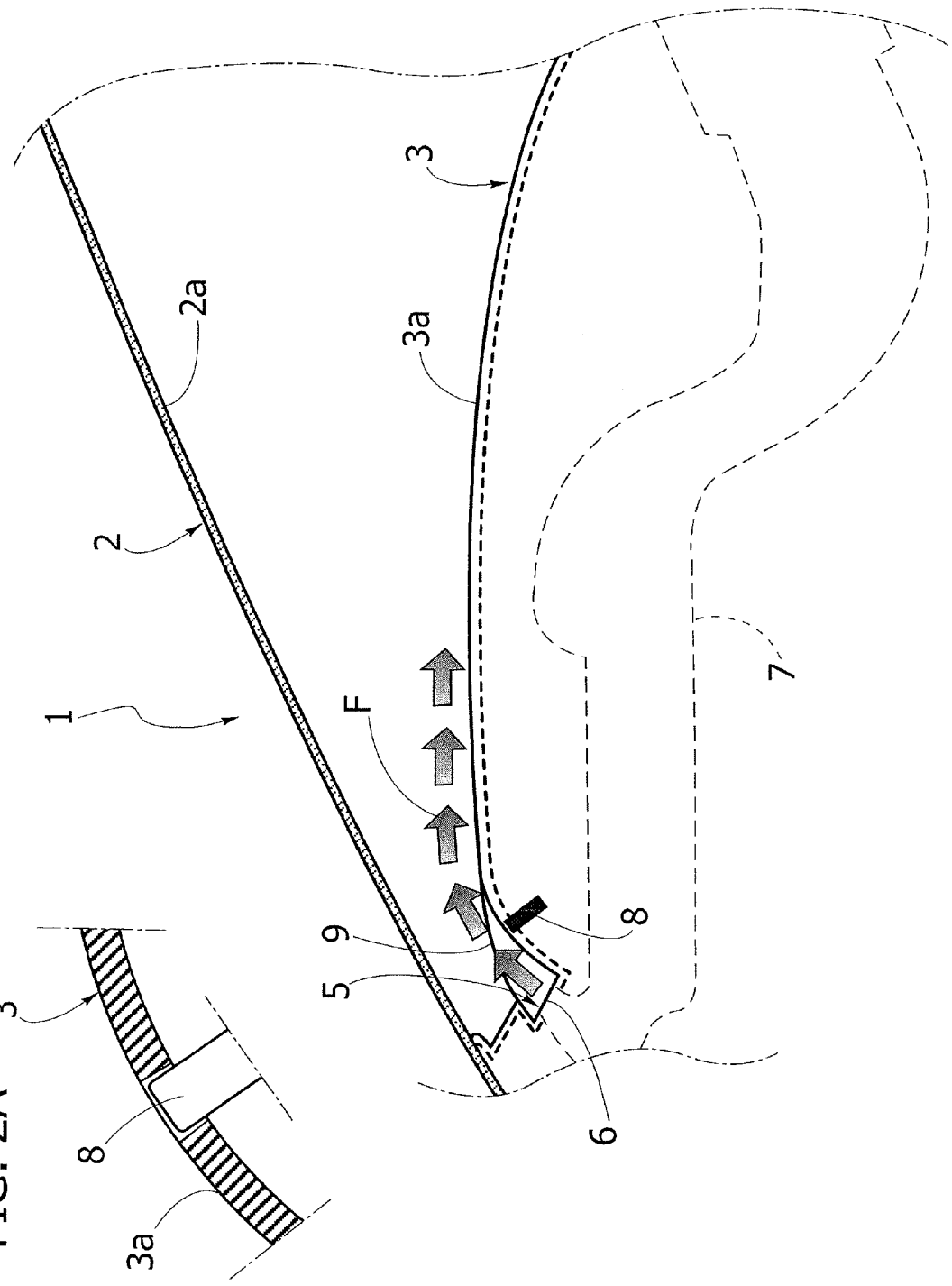
FIGS. 2 and 3 are schematic cross-sectional views of the device of FIG. 1, in two different conditions of operation.
Figure 3:
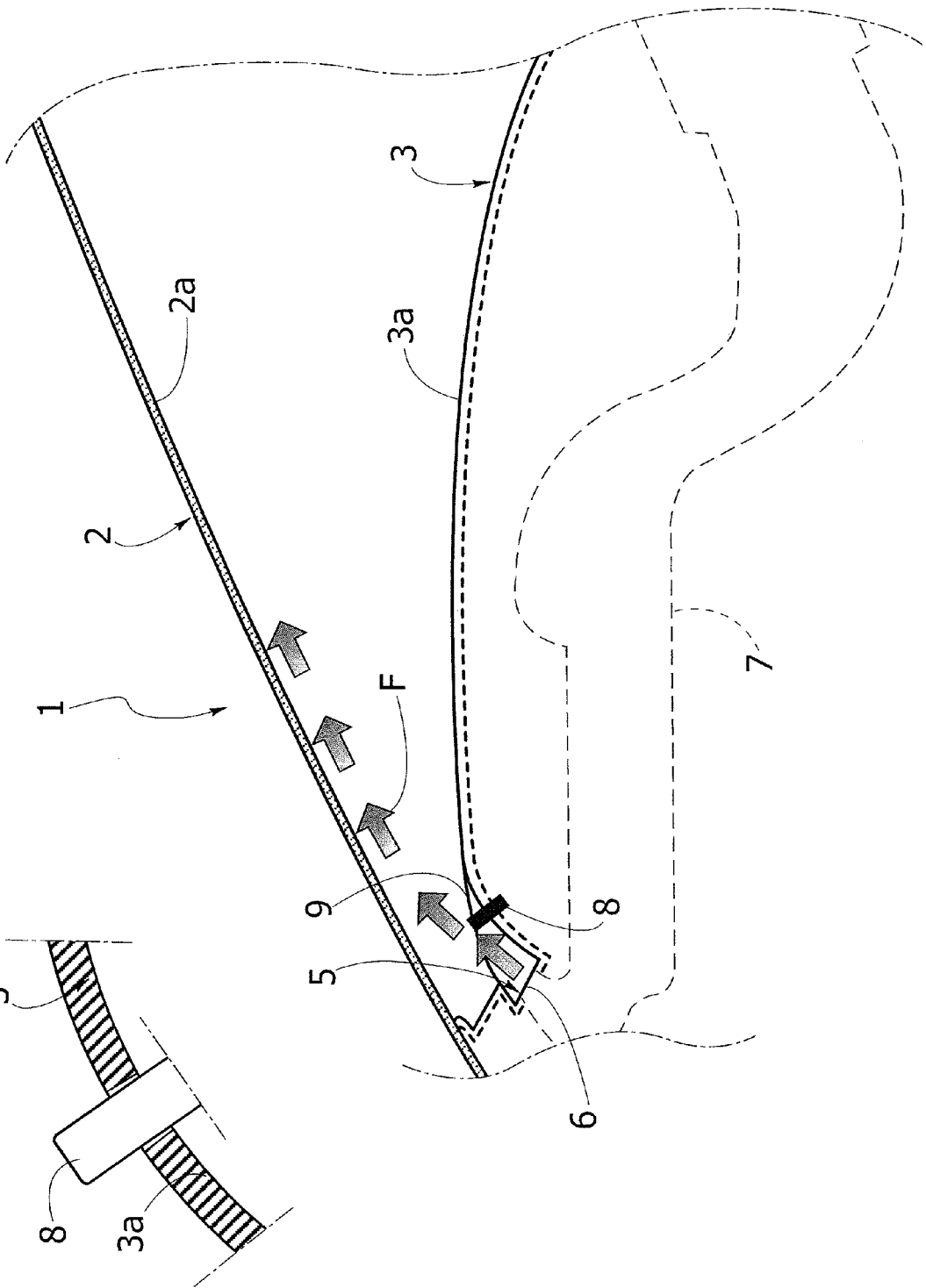

As may be seen in FIGS. 1, 2 and 3, at the two sides of each louver 6, the dashboard 3 is provided with a pair of fins 9, functioning as shield for delimiting at the sides the area involved in the flow F leaving the louver. The shields 9 delimit laterally, at least for a part of their height, said area, so as to prevent transverse flows of air. In particular, the shields 9 prevent the area of negative pressure that is created in a region adjacent to the surface to which the flow of air F adheres on account of the Coanda effect from being able to recall air from the side areas set outside the region impinged upon by the flow F, which would decrease the effectiveness of the Coanda effect. The shields 9 can extend throughout the height of the space comprised between the surfaces 3a and 2a or only for part thereof, as may be seen in the case of FIGS. 2 and 3.

Figure 4:
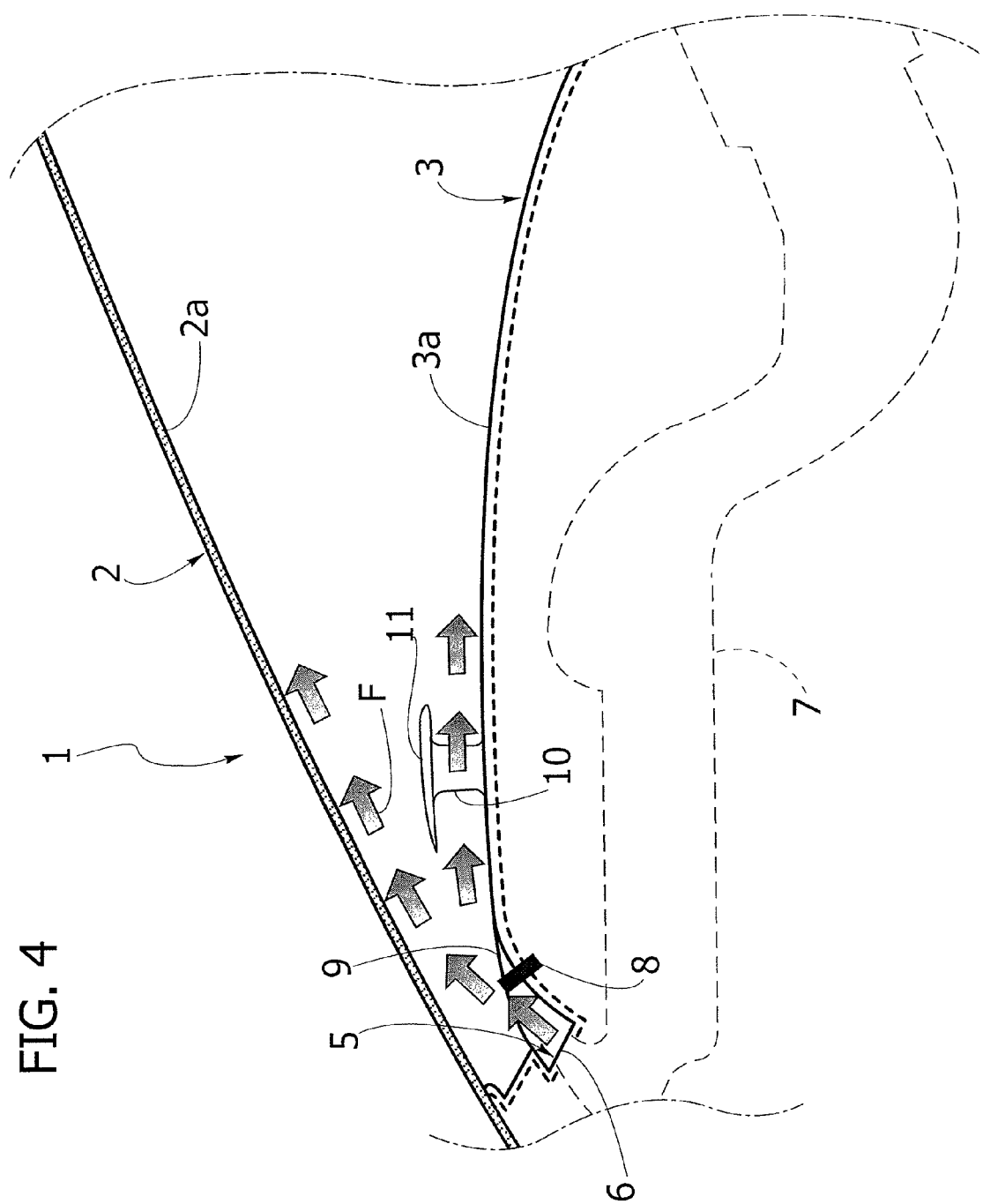
FIG. 4 is a schematic cross-sectional view, which illustrates a variant of the solution of FIGS. 1-3.

FIG. 4 illustrates a further variant in which the dashboard 3 has a support 10 for a dividing wall 11 set tangential to the flow F, at a certain distance from the outflow louver, for separating the area adjacent to the windscreen 2 from the area adjacent to the dashboard 3.

Of course, applications similar to the one described above may be envisaged, for example for other areas of the passenger compartment of a motor vehicle, for instance in an area adjacent to the side windows or to the rear window, or once again within the passenger compartment of vehicles of other types, such as for example railway vehicles or aircraft.

In addition, without prejudice to the principle of the invention, the details of construction and the embodiments may vary widely with respect to what is described and illustrated purely by way of example herein, without thereby departing from the scope of the present invention.

What is claimed is:

1. A system for distribution of air within a passenger compartment of a vehicle, said system comprising:
   at least one air-outflow louver located at an airflow opening on a surface facing an internal space of the passenger compartment, for supplying within the passenger compartment a flow of air coming from an air-conditioning device; and a first surface of the passenger compartment and a second surface of the passenger compartment, said first surface and said second surface facing the internal space of the passenger compartment, said first surface and said second surface set adjacent to one another and substantially divergent from one another starting from an area between said first surface and said second surface where said at least one outflow louver is located, a flow-perturbing element separate and downstream from said louver and spaced from said louver along said second surface, said flow-perturbing element moveable between an active position in which said element projects from said second surface, and an inactive position in which said element retracts away from said first surface below a side of said second surface closest to said first surface, and wherein a relative arrangement of the outflow louver and of said first surface and said second surface of the passenger compartment, and the profile of said first surface and said second surface of the passenger compartment, are such that:

when the perturbing element is in said inactive position, the flow of air at output from the outflow louver tends to adhere to said second surface of the passenger compartment due to the Coanda effect; and when the perturbing element is brought into its active condition, the flow of air detaches from said second surface of the passenger compartment and tends to adhere, and to remain adherent, to said first surface of the passenger compartment due to the Coanda effect.

2. The device according to claim 1, wherein a space delimited between said first and second surfaces of the passenger compartment in an area adjacent to said at least one outflow louver is at least partially defined by two shields set to sides of said at least one outflow louver, said shields projecting upwardly from said second surface toward said first surface and extending parallel to an axis of flow of the air to inhibit transverse flow of the air relative to said axis.

3. The device according to claim 1, wherein, in the space between said first and second surfaces of the passenger compartment at a certain distance from at least one outflow louver, a diaphragm is provided tangential to the flow of air for separating an area adjacent to the first surface of the passenger compartment from an area adjacent to the second surface of the passenger compartment.

4. The device according to claim 1, wherein said first surface of the passenger compartment is the internal surface of the windscreen of a motor vehicle, and said second surface of the passenger compartment is a top surface of the dashboard of the motor vehicle set underneath the windscreen, and in that said at least one outflow louver is provided on the top surface of the dashboard, immediately underneath the windscreen.

5. The device of claim 1 wherein said at least one outflow louver comprises an axis of flow parallel to a side of said second surface closest to said first surface.

6. The device of claim 1 wherein the flow of air output from the outflow louver is bounded by said first surface, said second surface, and at least two shields aligned parallel to the flow of air to inhibit a transverse movement of the flow of air relative to an axis of the flow of air at output from the outflow louver.

7. The device of claim 1 wherein said second surface is substantially smooth and continuous from said outflow louver along an entire length of said second surface in a direction of flow of the air when said flow-perturbing element is in said inactive position.

* * * * *